US010671602B2

(12) United States Patent
King et al.

(10) Patent No.: US 10,671,602 B2
(45) Date of Patent: Jun. 2, 2020

(54) RANDOM FACTOID GENERATION

(71) Applicant: Microsoft Technology Licensing, LLC, Redmond, WA (US)

(72) Inventors: Joseph Spencer King, Seattle, WA (US); Alice Jane Bernheim Brush, Bellevue, WA (US); Lisa Joy Stifelman, Palo Alto, CA (US); Eric Neal Loewenthal, Seattle, WA (US); Tulasi Menon, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 258 days.

(21) Appl. No.: 15/622,960

(22) Filed: Jun. 14, 2017

(65) Prior Publication Data
US 2018/0329950 A1 Nov. 15, 2018

Related U.S. Application Data

(60) Provisional application No. 62/503,633, filed on May 9, 2017.

(51) Int. Cl.
*G06F 17/00* (2019.01)
*G06F 16/245* (2019.01)
(Continued)

(52) U.S. Cl.
CPC .......... *G06F 16/245* (2019.01); *A63F 13/335* (2014.09); *A63F 13/35* (2014.09);
(Continued)

(58) Field of Classification Search
CPC ........ G06F 16/245; G06F 16/22; G06F 9/453; G06F 3/0482; G06F 7/582; A63F 13/335; A63F 13/35; A63F 13/65
See application file for complete search history.

(56) References Cited

U.S. PATENT DOCUMENTS 6,020,886 A 2/2000 Jacober et al.
6,651,053 B1 11/2003 Rothschild
(Continued)

FOREIGN PATENT DOCUMENTS

CN 101196793 A 6/2008
EP 1603031 A2 12/2005
EP 2521049 A1 11/2012

OTHER PUBLICATIONS

Eugene Agichtein et al, Analysis of Factoid Questions for Effective Relation Extraction, SIGIR '05: Proceedings of the 28th Annual International ACM SIGIR Conference on Research and Development in Information Retrieval, pp. 567-568, Aug. (Year: 2005).*
(Continued)

*Primary Examiner* — Greta L Robinson
(74) *Attorney, Agent, or Firm* — Merchant & Gould (57) ABSTRACT

Providing a random factoid in response to a user trigger is provided. Aspects are directed to a device, method, and computer-readable medium to provide random factoids responsive to a triggering event. Various inputs such as user taps, gestures, voice commands, environment commands, etc., are monitored to recognize a triggering event associated with the random factoid system. Upon determining that the input is a triggering event, a random factoid is randomly selected and provided to the user. The factoid can be a fun fact or a helpful learning tip. In some examples, the random factoid system provides a contextual random factoid based one or more contextual factors, such as geographic location of the device, the user's interaction history, the user's demographic data, etc., thus providing an improved user experience.

20 Claims, 9 Drawing Sheets

(51) Int. Cl.
*G06F 7/58* (2006.01)
*G06F 3/0482* (2013.01)
*G06F 16/22* (2019.01)
*A63F 13/335* (2014.01)
*A63F 13/65* (2014.01)
*G06F 9/451* (2018.01)
*A63F 13/35* (2014.01)

(52) U.S. Cl.
CPC ............ *A63F 13/65* (2014.09); *G06F 3/0482* (2013.01); *G06F 7/582* (2013.01); *G06F 9/453* (2018.02); *G06F 16/22* (2019.01)

(56) References Cited

U.S. PATENT DOCUMENTS

| | | | |
|---|---|---|---|
| 6,806,906 B1 | 10/2004 | Soga et al. | |
| 7,669,125 B2 | 2/2010 | Smirnov | |
| 7,707,204 B2* | 4/2010 | Li | G06F 16/313 |
| | | | 707/711 |
| 7,730,401 B2 | 6/2010 | Gillespie et al. | |
| 8,219,115 B1 | 7/2012 | Nelissen | |
| 8,566,718 B1 | 10/2013 | O'Neill | |
| 9,009,127 B1* | 4/2015 | Imielinski | G06F 16/3322 |
| | | | 707/706 |
| 9,098,826 B2 | 8/2015 | Jung et al. | |
| 9,477,493 B2 | 10/2016 | Jhoney et al. | |
| 2005/0138559 A1 | 6/2005 | Santos-gomez et al. | |
| 2005/0153688 A1 | 7/2005 | Burkhart et al. | |
| 2005/0268234 A1 | 12/2005 | Rossi et al. | |
| 2006/0242607 A1 | 10/2006 | Hudson | |
| 2008/0129686 A1 | 6/2008 | Han | |
| 2008/0163130 A1 | 7/2008 | Westerman | |
| 2009/0187824 A1 | 7/2009 | Hinckley et al. | |
| 2009/0195376 A1 | 8/2009 | Miller et al. | |
| 2009/0249253 A1 | 10/2009 | Mercer | |
| 2010/0093319 A1 | 4/2010 | Sherman | |
| 2010/0174599 A1 | 7/2010 | Rosenblatt et al. | |
| 2010/0306712 A1 | 12/2010 | Snook et al. | |
| 2010/0332236 A1 | 12/2010 | Tan | |
| 2011/0021234 A1 | 1/2011 | Tibbitts et al. | |
| 2011/0099474 A1 | 4/2011 | Grossman et al. | |
| 2011/0191675 A1 | 8/2011 | Kauranen | |
| 2011/0246880 A1 | 10/2011 | Horton et al. | |
| 2011/0271185 A1 | 11/2011 | Chen et al. | |
| 2011/0273589 A1 | 11/2011 | Mochimizo | |
| 2011/0294520 A1 | 12/2011 | Zhou et al. | |
| 2012/0036121 A1 | 2/2012 | Jitkoff et al. | |
| 2012/0101888 A1 | 4/2012 | Rothschild | |
| 2012/0117470 A1 | 5/2012 | Michelstein et al. | |
| 2012/0130927 A1 | 5/2012 | Shimogori | |
| 2012/0199645 A1 | 8/2012 | Rothschild | |
| 2012/0200574 A1 | 8/2012 | Hill et al. | |
| 2012/0209573 A1 | 8/2012 | Karrat | |
| 2012/0209922 A1 | 8/2012 | Bhatia et al. | |
| 2013/0090103 A1 | 4/2013 | Kim et al. | |
| 2013/0090998 A1 | 4/2013 | Shimogori | |
| 2013/0326353 A1* | 12/2013 | Singhal | G06F 3/167 |
| | | | 715/728 |
| 2014/0006944 A1 | 1/2014 | Selig et al. | |
| 2014/0249817 A1 | 9/2014 | Hart et al. | |
| 2015/0149496 A1 | 5/2015 | Neeman et al. | |
| 2016/0098992 A1* | 4/2016 | Renard | G10L 15/18 |
| | | | 704/275 |
| 2016/0291802 A1 | 10/2016 | Beck et al. | |
| 2016/0342317 A1 | 11/2016 | Lim et al. | |
| 2017/0046124 A1 | 2/2017 | Nostrant | |
| 2017/0351532 A1* | 12/2017 | Li | G06F 9/4843 |
| 2017/0365008 A1* | 12/2017 | Schreier | G06Q 50/16 |

OTHER PUBLICATIONS

Jiang Bian et al., Finding the Right Facts in the Crowd: Factoid Question Answering over Social Media, WWW '08: Proceedings of the 17th International Conference on World Wide Web, pp. 467-476, Apr. (Year: 2008).*
"Communicating with Animated Infographics", Retrieved from: http://understandinggraphics.com/graphic-analysis/animated-infographics/, Aug. 17, 2011, 8 Pages.
"Making Google Spreadsheet Functions Easier to Discover and use", Retrieved from: https://www.miadria.com/making-google-spreadsheet-functions-easier-to-discover-and-use/, Aug. 9, 2011, 3 Pages.
"Final Office Action Issued in U.S. Appl. No. 13/539,849", dated Aug. 25, 2016, 24 Pages.
"Final Office Action Issued in U.S. Appl. No. 13/539,849", dated Nov. 4, 2014, 28 Pages.
"Final Office Action Issued in U.S. Appl. No. 13/539,849", dated May 4, 2017, 23 Pages.
"Non Final Office Action Issued in U.S. Appl. No. 13/539,849", dated Nov. 22, 2017, 30 Pages.
"Non Final Office Action Issued in U.S. Appl. No. 13/539,849", dated Dec. 9, 2016, 26 Pages.
"Non Final Office Action Issued in U.S. Appl. No. 13/539,849", dated Jan. 13, 2016, 26 Pages.
"Non Final Office Action Issued in U.S. Appl. No. 13/539,849", dated Dec. 23, 2013, 23 Pages.
"Non Final Office Action Issued in U.S. Appl. No. 13/539,849", dated Jul. 18, 2014, 24 Pages.
"Office Action Issued in European Patent Application No. 13739550.5", dated Jul. 5, 2016, 5 Pages.
"First Office and Search Report Issued in Chinese Patent Application No. 201380035458.4", dated Oct. 19, 2016, 12 Pages.
"Office Action Issued in Chinese Patent Application No. 201380035458.4", dated Nov. 6, 2017, 10 Pages.
"Second Office Action Issued in Chinese Patent Application No. 201380035458.4", dated May 27, 2017, 13 Pages.
"International Search Report & Written Opinion for PCT Patent Application No. PCT/US2013/048978", dated Dec. 5, 2013, 8 Pages.
Vanacken, et al., "Ghosts in the Interface: Meta-user Interface Visualizations as Guides for Multi-touch Interaction", Retrieved from: http://citeseerx.ist.psu.edu/viewdoc/download?doi=10.1.1.150.3932&rep=rep1&type=pdf, Oct. 1, 2008, pp. 81-84.
Viriyakattiyaporn, Petcharat, "An Active Help System to Improve Program Navigation", Thesis Submitted in Partial Fulfilment of the Requirements for the Degree of Master of Science, University of British Columbia, Apr. 2009, 150 Pages.
White, "Visual Hints for Tangible Gestures", Retrieved from: http://www1.cs.columbia.edu/~swhite/pubs/white-2007-ismar.pdf, Aug. 17, 2011, 4 Pages.
"Use Siri on your iPhone, iPad, or iPod touch", https://support.apple.com/en-in/HT204389, Published on: Mar. 8, 2017, 2 pages.
"International Search Report & Written Opinion for PCT Patent Application No. PCT/US18/028455", dated Jul. 5, 2018, 13 Pages.
Boudreaux, Toby, "Touch Patterns: Chapter 6—Programming the iPhone User Experience", Retrieved from: https://web.archive.org/web/20110808060131/http://oreilly.com/iphone/excerpts/iphone-programming-user/touch-patterns.html, Aug. 17, 2011, [[4]] 12 Pages.

* cited by examiner

RANDOM FACTOID GENERATION

CROSS REFERENCE TO RELATED APPLICATIONS

The present disclosure claims priority from U.S. Provisional Patent Application Ser. No. 62/503,633, having the title of "RANDOM FACTOID GENERATION" and the filing date of May 9, 2017, which is incorporated herein by reference in its entirety.

BACKGROUND

Computing device applications are increasingly being developed with an intuitive design approach such that features of the application are intuitively obvious to users. For example, applications oftentimes comprise various shortcuts and features to help users to use the applications more efficiently. Further, developers are regularly updating computing device applications to provide new application features and functionalities. However, some application features may not be intuitively obvious, and users may not be aware of them. One example application type is an intelligent assistant application for providing users with relevant information. For example, intelligent assistants are oftentimes used to provide directions, to look up local attractions, for weather updates, etc. Helping users understand capabilities of a computing device or an application, such as an intelligent assistant, is a challenging problem, especially for an application that is regularly gaining new capabilities and features.

On computing devices with screens, various features or usage tips can be provided on the screen to inform users about various functionalities and capabilities of an application that can improve the user's experience with their devices. However, users may become disinterested in learning such tips, and may dismiss them without paying attention to them. On an audio-only device without a screen, such as a hands-free speaker that connects with an intelligent assistant, various features and functionalities may be supported that are not intuitively obvious. A user of such a device may be reduced to a "guess and try" interaction style, where the user asks a question and randomly tries certain commands or interactions to puzzle out what works. Further, conveying functionalities and capabilities to the user can be challenging.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Aspects are directed to a device, method, and computer readable storage device for providing a random factoid responsive to a triggering event. For example, a random factoid system is provided that is operative to provide unpredictable information to a user. Upon receiving an input that signals to the random factoid system to provide information, such as a user tap, gesture, voice command, actuation of a button or switch, environmental condition, etc., the system parses one or more data sources to randomly select a factoid, and provide the factoid to the user.

In some examples, the factoid is a helpful learning tip to help the user to use undiscovered application or device features or to use an application more efficiently. In other examples, the factoid is a fun fact to help engage the user and to increase the user's interest. In some examples, a predetermined ratio of helpful learning tips and fun facts are provided to the user in a random order. For example, a factoid may be selected and presented to the user based on a ratio of 80% fun tips to 20% learning tips. As can be appreciated, variability and unpredictability of factoid provision is likely to encourage the user to interact with the system more frequently. For example, the user is likely to interact with the system more frequently to see what type of factoid the user receives. Accordingly, tips that educate the user about capabilities of a device or applications or tips associated with increased user interaction efficiency are exposed to the user. When operating on or in association with a device using a voice or speech user interface, such tips are exposed in a manner that overcomes limitations of the user interface.

In one aspect, a randomized factoid is selected and presented to the user based at least in part on context data. For example, context associated with the device or the user, such as geographic location, interaction history, demographic data, user preferences, etc., can be used to select and provide a factoid that is relevant to the user, thus providing an improved user experience. User efficiency and computing device efficiency can be improved by exposing information to users associated with features or functionalities that can improve interaction with the device.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Figure 1:
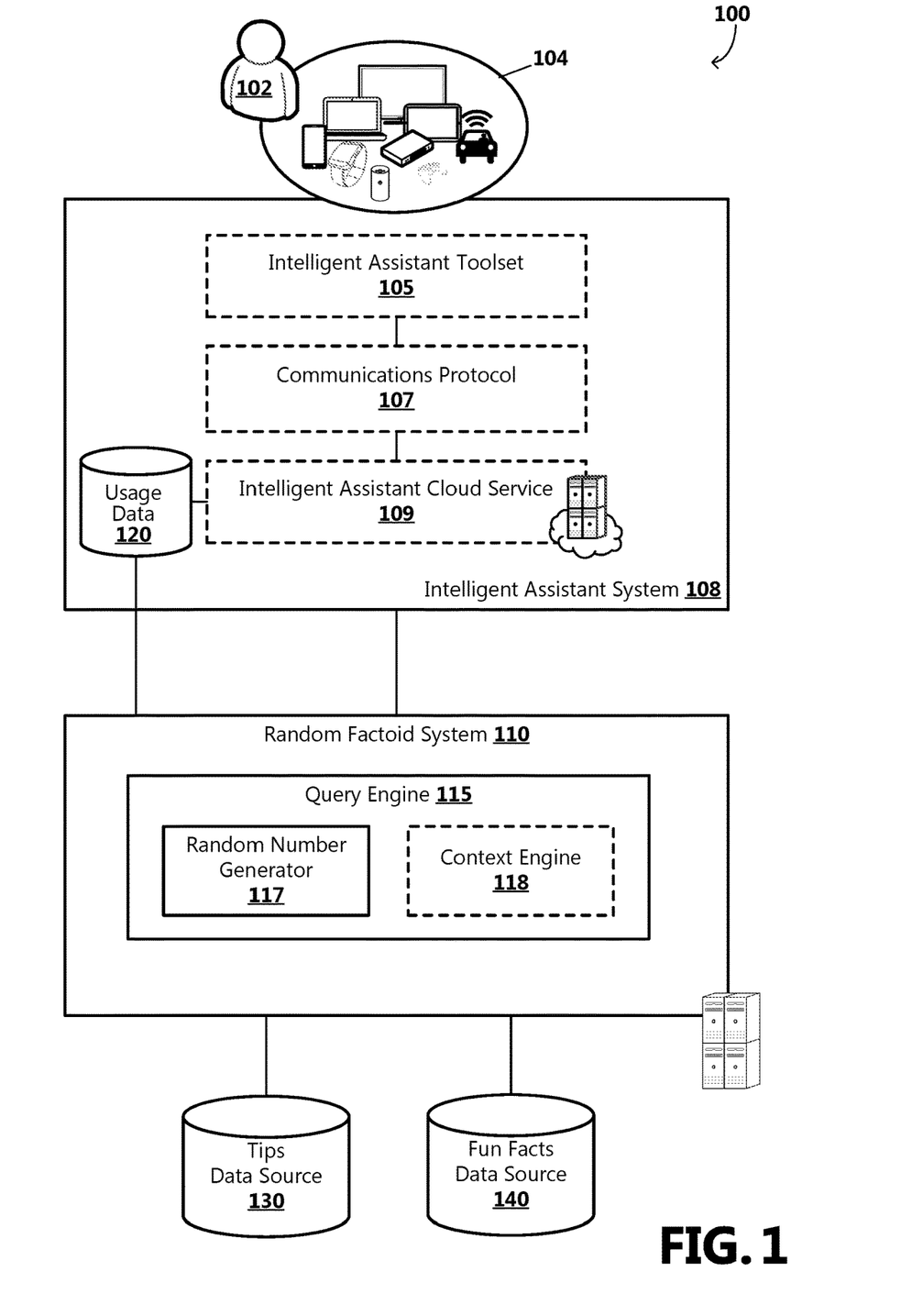
FIG. 1 is a block diagram illustrating an example operating environment in which a random factoid system can be implemented for providing a random factoid in response to a triggering event.

Aspects of the present disclosure are directed to a device, method, and computer-readable medium for providing random factoids in response to a user trigger. FIG. 1 is a block diagram of a representation of an example computing operating environment 100 in which providing a random factoid in response to a triggering event is implemented. As illustrated, the example environment 100 includes a computing device 104. For example, the computing device 104 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, or other type of computing device). The hardware of these computing devices is discussed in greater detail in regard to FIGS. 5, 6A, 6B, and 7.

In one example, the computing device 104 is embodied as a conventional wireless entertainment system that comprises or employs speakers, a microphone, and processing equipment, and is connected to a network or a combination of networks, which include, for example and without limitation, a wide area network (e.g., the Internet), a local area network, a private network, a public network, a packet network, a circuit-switched network, a wired network, and/or a wireless network. In some examples, the computing device 104 operates as a frontend for one or more web services, such as an audio, video, or other digital content streaming service, an online store, and the like.

According to one example, the device operates as a frontend for an intelligent assistant system 108 or service. For example, the computing device 104 comprises a microphone and operates to act as a voice command device, wherein a user 102 can request certain content to be played over the device (e.g., movie times, sport scores, weather forecasts), or request certain tasks to be performed (e.g., set an alarm, take notes, turn on a light, send a message, control a thermostat, request car transportation). In some examples, the computing device 104 includes a screen operative to display a graphical user interface (GUI).

In some examples, the frontend of the computing device 104 is configured to receive an input that indicates to the intelligent assistant system 108 that the user 102 is requesting particular content, such as a random fact. For example, the input can be one or a combination of an actuation of a button or switch, a user tap, a gesture, a spoken keyword, an environmental factor, or the like. In some examples, a tap or a keyword (e.g., an attention word) is employed to indicate to the system 108 that a voice command follows. For example and according to one aspect, the intelligent assistant system 108 can be spoken to using the keywords "Hey, John Doe" followed by a command, such as, for example, "play a random fact." The audio signal is then digitized, in whole or in part, for transmission over the network, and the device contacts a particular remote service or voice platform, which responds with a random factoid. Other input methods are possible and are within the scope of the present disclosure. For example, the computing device 104 is operative to receive input from the user 102 via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. Speech recognition applications are well-known, and may be included in the computing device 104, accessed remotely, or in combination.

According to one example, the frontend of the intelligent assistant system 108 includes an intelligent assistant toolset 105 that comprises a set of codes for communicating with the backend service, for example, an intelligent assistant cloud service 109 via a communications protocol 107. One example of the intelligent assistant toolset 105 is an intelligent assistant software development kit (SDK). One example communications protocol 107 is web socket. In some examples, the computing device 104 raises an event into the intelligent assistant toolset 105 that an input has been received and that the input is a trigger for employing a random factoid system 110, for example, to provide a random factoid to present to the user 102. In other examples, the intelligent assistant toolset 105 makes the determination as to whether a received input is a trigger for employing the random factoid system 110. In some examples, the intelligent assistant toolset 105 is operative to call out to specific device functionalities. For example, upon receiving an indication of a random factoid triggering event, the intelligent assistant toolset 105 can turn down the volume of music playing on the computing device 104.

According to an aspect, the frontend of the intelligent assistant system 108 (e.g., the intelligent assistant toolset 105) raises the random factoid triggering event to the intelligent assistant cloud service 109 in a message. In some examples, the message includes additional information, such as device information, user information, location information, or usage information. For example, device information can include information about the computing device 104 on which intelligent assistant services are being requested, such as the device type, a device identifier (ID), etc. User information can include identifying information about the user 102 who is logged into the computing device 104 or the user who is providing input that is triggering the random factoid system 110, such as a user ID or a user type (e.g., adult user, child user, female user, male user) that can be linked to a user profile or a user type profile. In some examples, user information is determined by a component of or in communication with the intelligent assistant system 108. For example, voice recognition, image recognition, or other recognition functionalities can be used to identify a user 102 or a user type. Usage information can include information associated with a current action of the user 102 on the computing device 104. For example, if the user 102 is listening to music on the computing device 104, the message can include information associated with the fact that the user 102 is listening to music. As another example, the usage information can include other details, such as the type of music the user 102 is listening to, an application that the user 102 is using, etc. Additional information can be provided to the intelligent assistant cloud service 109 or looked up by the intelligent assistant cloud service 109. In one example, the intelligent assistant cloud service 109 is operative to look up the user's calendar information, location information, etc. In another example, the intelligent assistant cloud service 109 is operative to store usage data, for example, in a usage data database 120. Usage data can include user profile information, user interaction and usage history data, etc. For example, usage data can be used to determine user preferences, features that the user 102 has used, applications that the user 102 has used, types of content the user 102 regularly searches for or requests, and the like. The usage data can be linked to a particular user 102 or to a particular computing device 104.

According to an aspect, the intelligent assistant cloud service 109 includes or is in communication with a random factoid system 110 that includes a query engine 115 operative to query a factoid data source, such as a tips data source 130 or a fun facts data source 140, for a random factoid. In some examples, the tips data source 130 operates as a queryable data store of helpful tips. For example, the tips data source 130 can include a database, a list, an index of web data that includes helpful tips, and the like. According to one aspect, helpful tips include tips associated with commands that can be used for accessing or using device or application features or functionalities, which for example, can help to increase user interaction efficiency. In some examples, the tips data source 130 includes tips associated with capabilities of the intelligent assistant system 108, such as "Like trivia? Try saying, 'Hey X (where, X is a name of the intelligent assistant and 'Hey X' is a keyword phrase or attention word that is employed to indicate to the system 108 that a voice command follows), tell me something interesting.'." Another example helpful tip is "I can tell you what song is playing. Try saying, 'Hey X, what song is this?'." As should be appreciated, these are non-limiting examples. Other types of helpful tips are possible and are within the scope of the present disclosure. According to one aspect, the tips data source 130 is continually updated with new or improved functionalities and capabilities.

In some examples, the fun facts data source 140 operates as a queryable data store of fun factoids such as jokes, trivia factoids, encyclopedic factoids, or other entertaining tidbits of information, etc. For example, the fun factoids data source 140 can include a database, a list, an index of web data that includes fun factoids, and the like. One example of a fun fact factoid that could be stored in the fun facts data source 140 is a factoid such as "Butterflies can taste with their feet. If people could do that, there'd be chocolate socks." Another example fun factoid is "Lichtenstein has only 370,000 inhabitants, and is one of the smallest countries in the world. But, it's the world's biggest manufacturer of false teeth." As should be appreciated, these are non-limiting examples. Other types of fun factoids are possible and are within the scope of the present disclosure. In some examples, the tips data source 130 and the fun facts data source 140 are further operative to mine other data sources for factoid or encyclopedic-based information for providing a random factoid in response to a triggering event.

In some examples, each of the helpful tip factoids stored in the tips data source 130 and the fun factoids stored in the fun facts data source 140 are identified by a unique identifier (UID). Further, according to an aspect, the query engine 115 comprises or is in communication with a random number generator 117, illustrative of a software module, microchip, system, or device operative to generate a random or pseudo-random number for unpredictably selecting a helpful tip factoid or a fun factoid. For example, a random or pseudo-random number is generated by the random number generator 117, which corresponds with a UID of a factoid or a factoid type (e.g., helpful tip factoid versus fun factoid). In some examples, a predetermined helpful tip factoid to fun factoid ratio is applied to the query engine 115 such that a given frequency of helpful tips and a given frequency of fun factoids are exposed to the user 102. One example predetermined helpful tip factoid to fun factoid ratio is 1 to 5, where one helpful tip factoid is provided for every 5 fun factoids, wherein the order of helpful tip factoids and fun factoids are random. In some examples, the ratio is determined based on a particular user profile or other usage data. In one example, the random factoid system 110 uses usage data stored in the usage data database 120 to determine a ratio of helpful tip factoids to fun factoids. For example, if usage data indicate that a particular user 102 is a child user, a determined ratio may include a higher percentage of fun factoids.

In some examples, the query engine 115 comprises a context engine 118 operative to apply context to a query of the tips data source 130 or the fun facts data source 140. For example, factoids stored in the tips data source 130 and the fun facts data source 140 are tagged with metadata associated with the factoid such as, one or more keywords, topics, categories, etc., that enable factoids to be searched for and selected based on an association with a queried term. The context engine 118 is operative to use usage data (e.g., user profile information, user interaction data, usage history data) to query the tips data source 130 or the fun facts data source 140 for a factoid related to a particular feature, point of interest, region of interest, category of interest, topic of interest, and the like. That is, the intelligent assistant system 108 is operative to provide contextual random factoids to users 102. In one example, the random factoid system 110 is operative to provide a random factoid associated with a feature the user 102 has not previously used as determined from the usage data.

For example, consider that the intelligent assistant system 108 includes a feature that allows users 102 to track flights, and that the user 102 has not used this feature. The usage data database 120 can be queried for features the user 102 has not used, and the flight tracking feature can be identified as an unused feature. Accordingly, when a helpful tip factoid is desired based on a generated random or pseudo-random number, the context engine 118 can query the tips data source 130 for a factoid related to flight tracking. As another example, consider that the user 102 frequently asks the intelligent assistant system 108 for jokes. This usage data can be stored in the usage data database 120 and used as contextual information in a query for selecting a particular type of fun factoid from the fun facts data source 140. As another example, consider that usage data for the user 102 indicates that the user 102 enjoys football. Also consider that the user 102 is visiting New York City. The user's interest in football and/or the user's location data can be used as contextual information in a query for selecting a fun factoid from the fun facts data source 140 relating to football and/or New York City. For example, the user 102 may be provided with a fun factoid relating to football, such as "It takes about 600 cows to make one full season's worth of NFL footballs." In another example, the user 102 may be provided with a fun factoid relating to New York City, such as "New York City was originally called New Amsterdam." In another example, the user 102 may be provided with a fun factoid relating to football and New York City, such as "The New York Giants played at Yankee Stadium from 1956 until 1973." As should be appreciated, these are non-limiting examples. Other types of context information for querying the tips data source 130 or the fun facts data source 140 for a random contextual factoid are possible and are within the scope of the present disclosure.

According to an aspect, when a helpful tip factoid or a fun factoid is selected, the intelligent assistant system 108 delivers or exposes the selected factoid to the user 102. For example, the backend of the intelligent assistant system 108 (e.g., the intelligent assistant cloud service 109) uses a communications protocol 107 to communicate the selected factoid to the front end of the intelligent assistant system (e.g., the intelligent assistant toolset 105), which is operative to deliver intelligent assistant system 108 responses to the user 102. In some examples, a random factoid is played through a computing device speaker in the form of a spoken or audio message. In other examples, a random factoid is displayed on a computing device screen as a displayable message.

According to one aspect, context carryover is provided for enabling a conversational dialog related to a factoid. In one example, when a random factoid is provided to the user 102 via the computing device 104, a microphone operatively connected to the computing device 104 is opened for receiving user feedback. Further, knowledge of the provided factoid is temporarily retained such that it can provide context for a follow-up statement made by the user 102. For example, responsive to being provided with a random factoid such as "Covering an expanse of over 6.6 million square miles, Russia is the world's largest country by landmass, beating out runner-up Canada by around 2.8 million square miles," the user 102 may respond to the intelligent assistant system 108 with a follow-up question, such as "What is the third largest country?" Accordingly, the intelligent assistant system 108 is operative to process the user input, and query a data source for a response to provide to the user 102.

Figure 2:
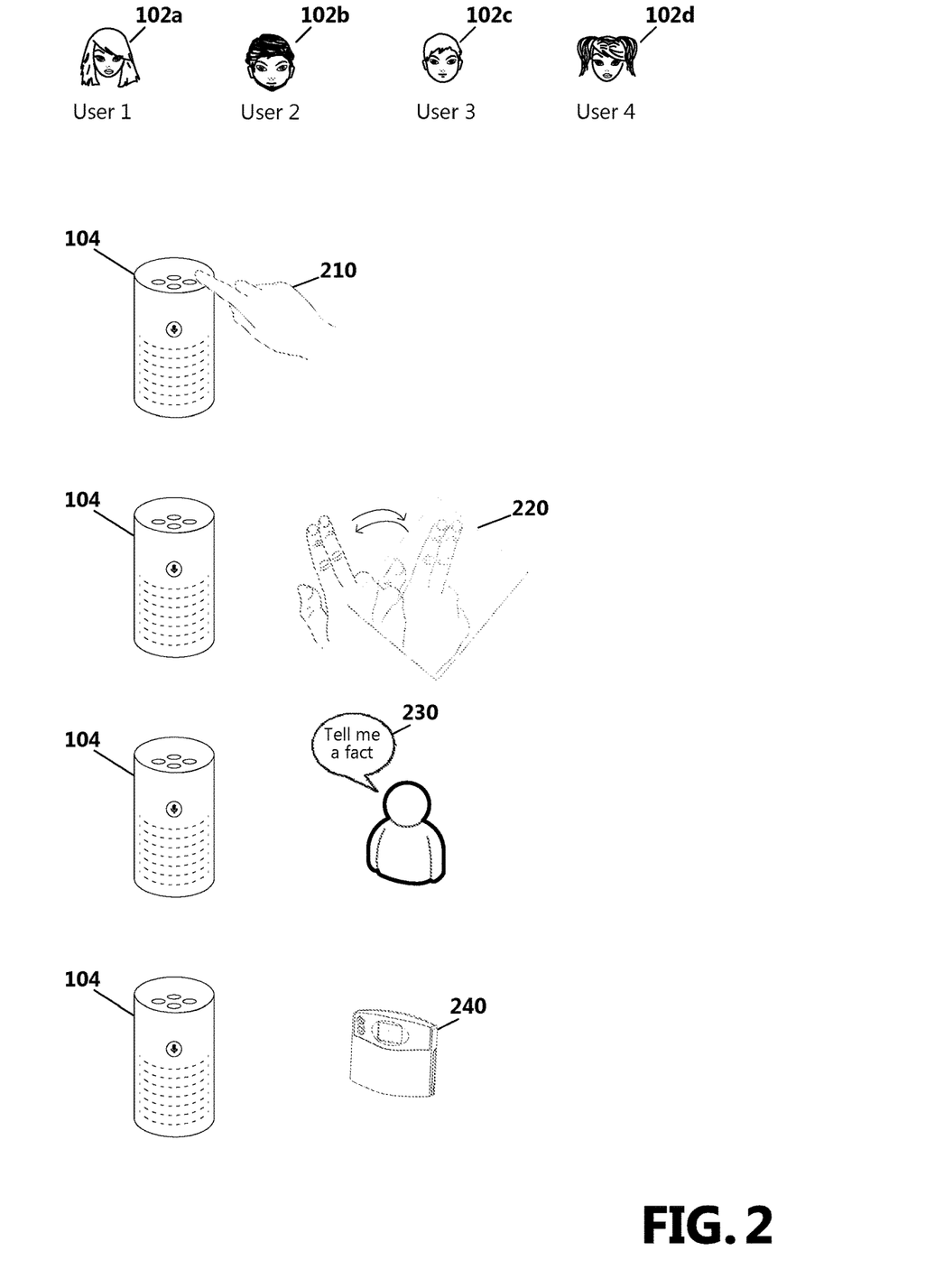
FIG. 2 is an illustration showing example triggering events.

With reference now to FIG. 2, various example user and environmental inputs are shown that can be identified as a triggering event for the random factoid system 110. In one example and as illustrated, a user tap 210 on the computing device 104 can raise a random factoid triggering event to the intelligent assistant system 108. For example, the tap 210 may be anywhere on the computing device 104, on a specific location on the computing device 104, or can include a selection or actuation of a button on the computing device 104. In another example, a particular gesture 220 input on or near the computing device 104 can raise a random factoid triggering event to the intelligent assistant system 108. In another example, a spoken utterance 230 can be identified as a triggering event for the random factoid system 110. In another example, an environmental condition 240 that can be measured and communicated with the computing device 104 can be identified as a triggering event for the random factoid system 110. For example, when a certain temperature, noise level, lighting level, humidity level, pollen level, or other environmental condition is identified, a random factoid event is raised to the intelligent assistant system backend. In some examples, context data associated with the identified temperature, noise level, lighting level, humidity level, pollen level, or other environmental condition are communicated in the message to the backend. According to an aspect, the random factoid system 110 is operative to query the tips data source 130 or the fun facts data source 140 for a random factoid related to an identified environmental condition. For example, if the room temperature is 68 degrees Fahrenheit as detected by a thermostat communicatively connected to the computing device 104, the random factoid system 110 may provide a factoid related to air conditioning energy conservation, such as "Each year, the U.S. uses the same amount of energy to power air conditioners as Africa uses to power the entire continent."

More than one user 102 can be associated with a computing device 104 or intelligent assistant system 108. In one example, in a household where multiple users 102a-n reside, the users (e.g., user 1 102a, user 2 102b, user 3 102c, and user 4 102d) can be recognized based on facial recognition, voice recognition, or other recognition methods. According to an aspect, the random factoid system 110 is operative to provide a random factoid based upon recognition of a given user 102. For example, the computing device 104 is operable to recognize the voice of a particular user 102 or a particular user group via speech recognition methods, and communicate the recognition to the backend for associating the user 102 with a particular user profile. Accordingly, the random factoid system 110 is operative to query the tips data source 130 or the fun facts data source 140 for a random factoid based on the context of the recognized user 102.

Figure 3A:
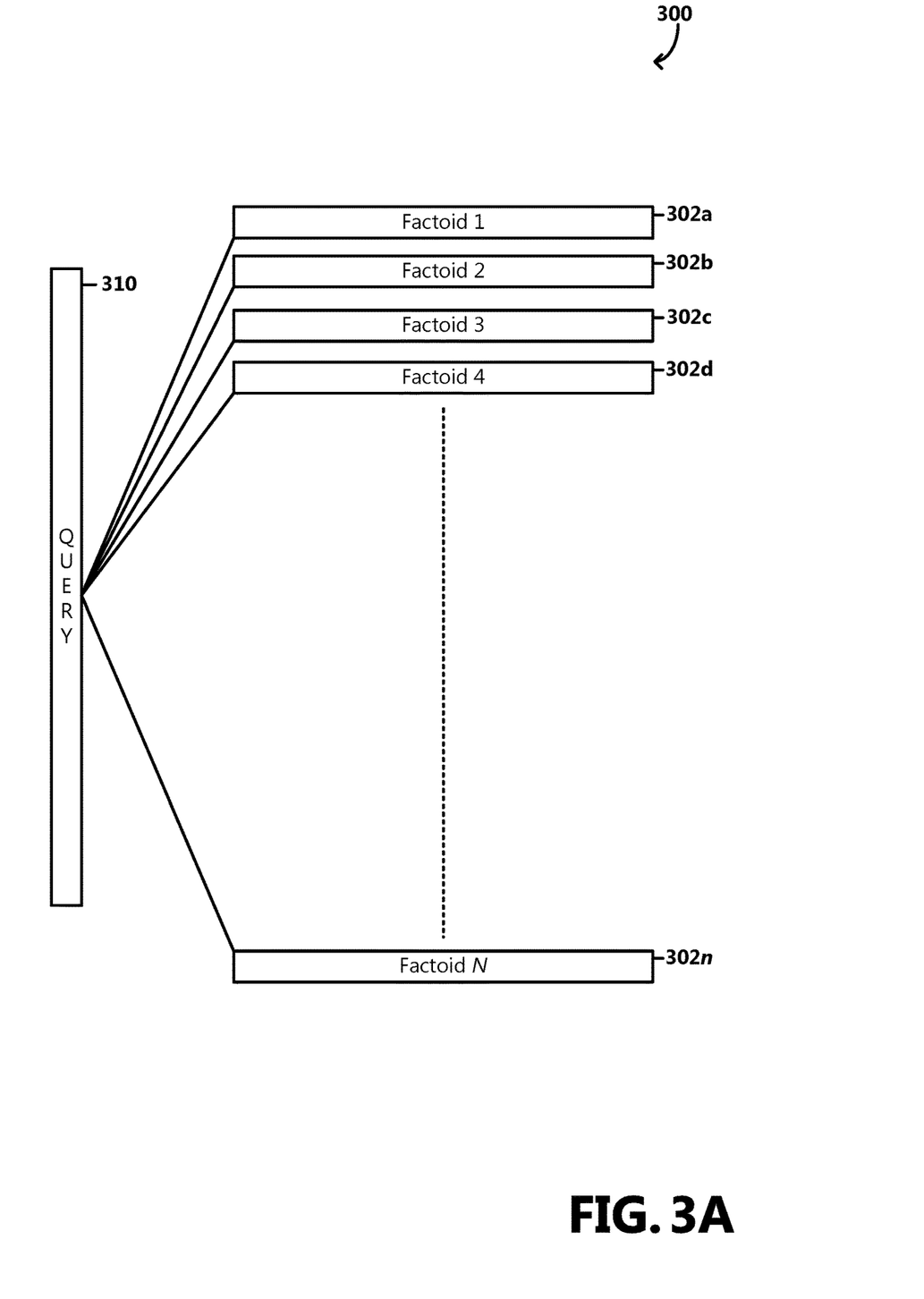
FIG. 3A is a block diagram illustrating an example query of a data source for selecting and providing a random factoid.

FIG. 3A is a block diagram 300 illustrating an example query 310 of a data source 130, 140 for selecting a random factoid 302. For example, Factoids 1 through N 302a-n are stored in the tips data source 130 or the fun facts data source 140. In one aspect, each of the factoids 302 has a UID associated with it. In one example, upon determining that a received input is a triggering event, the query engine 115 generates a query 310, which in some examples includes context information included in the event message. According to an example, the query engine 115 uses the random number generator 117 to generate a random or pseudo-random number for randomly selecting a UID corresponding to a factoid to provide to the user 102.

Figure 3B:
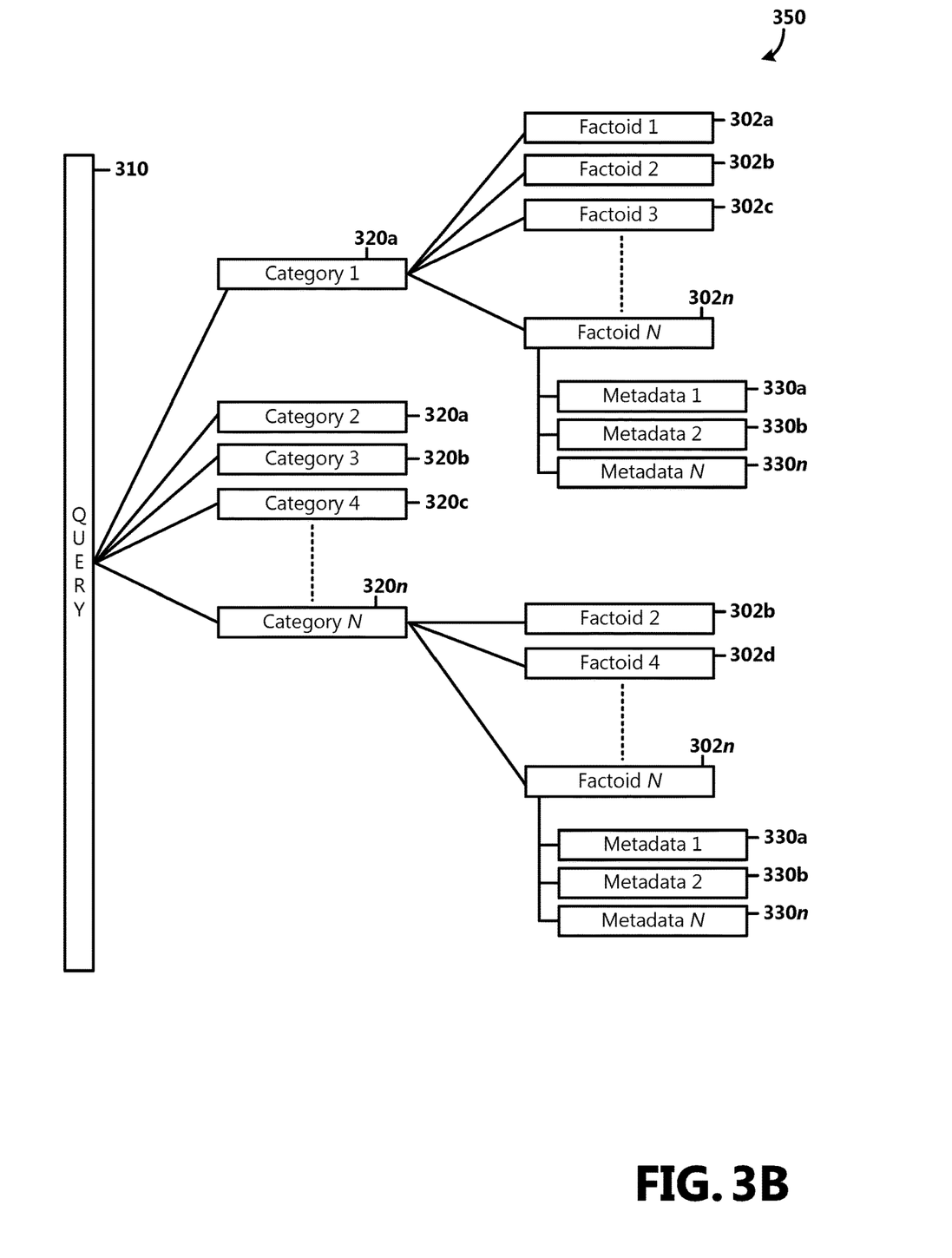
FIG. 3B is a block diagram illustrating an example query of a data source for selecting and providing a contextual random factoid.

FIG. 3B is a block diagram 350 illustrating an example query 310 of a data source 130, 140 for selecting a contextual random factoid 302. In some examples and as illustrated, factoids 302 are classified into various categories 1 through N 320a-n in the tips data source 130 or the fun facts data source 140. For example, if the user 102 travels to a particular location, for example, Seattle, the random factoid system 110 is operable to identify geographic location data included in the event message provided to the backend of the intelligent assistant system 108, and use the geographic location data to select a contextual random factoid 302 related to the particular geographic location category 320. As will be appreciated, a given factoid 302 may belong to several categories 320, and categories 320 may be nested. For example, factoids 302 related to the city of Seattle may also belong to a category 320 for the state of Washington and a category 320 for the city of Seattle. Additionally, a factoid 302 may belong to several categories 320 that are not nested, such as, for example, a factoid 302 related to a sports team in Seattle belonging to both a Seattle category 320 and a sports category 320. As illustrated, factoid 2 302b and factoid N 302n belongs to category 1 320a and category N 320n, but factoids 302a, 302c, and 302d are not shared between category 1 320a and category N 320n.

In other examples and as illustrated, factoids 302 stored in the tips data source 130 or the fun facts data source 140 are tagged with metadata 1 through N 330a-n, which enables the factoids 302 to be queried based on the metadata 330. For example, a particular factoid 302n may be tagged with metadata such as "nature" (metadata 1 330a), "tree" (metadata 2 330b), and "redwoods" (metadata N 330n). When context information is provided that indicates user interest in redwoods, the query engine 115 is operative to query the tips data source 130 or the fun facts data source 140 for a factoid 302 related to "redwoods." Accordingly, in the above example, factoid N 302$n$ is one factoid 302 that could be selected by the query engine 115 based on factoid N 302$n$ being tagged with metadata N 330$n$ for "redwoods". In some examples, the query engine 115 uses the random number generator 117 to generate a random or pseudo-random number for randomly selecting a factoid 302 from a plurality of factoids related to a particular query 310. Further, according to an example, a particular factoid 302 may be classified under a plurality of categories 320 or may be tagged with various pieces of metadata 330. Accordingly, a factoid 302 can be queried based on a plurality of context information (e.g., a factoid 302 related to "Seattle" and "baseball.")

Having described an operating environment 100, components of the random factoid system 110, and various query examples with respect to FIGS. 1-3B, FIG. 4 is a flow chart showing general stages involved in an example method 400 for providing a random factoid 302 in response to a triggering event.

Figure 4:
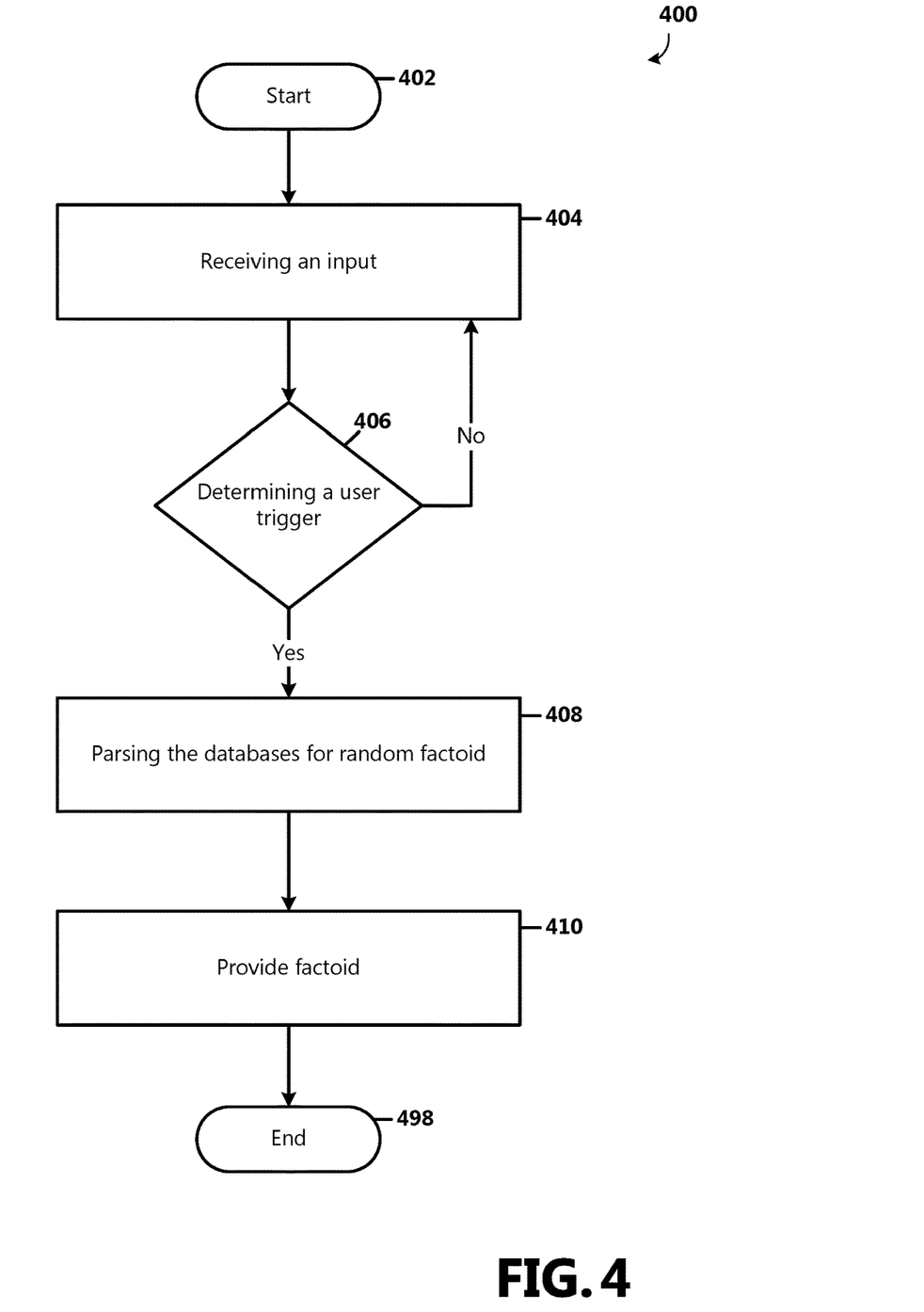
FIG. 4 is a flowchart showing general stages involved in an example method of providing a random factoid in response to a triggering event.

The method 400 begins at OPERATION 402 and proceeds to OPERATION 404, where an input is received by the computing device 104. For example, the input can include a user input, such as a tap 210 or selection of a button, a gesture 220, or an utterance 230, or can include an environmental input or condition 240.

Upon receiving the input, the method 400 proceeds to DECISION OPERATION 406, where a determination is made as to whether the received input is a random factoid triggering event. For example, if a user 102 taps on the device, the system classifies the input as a triggering event for the random factoid system 110. At DECISION OPERATION 406, if a determination is made that the input is not a random factoid triggering event, the method 400 returns to OPERATION 404, where the computing device 104 listens for inputs.

If a determination is made that the received input is a random factoid triggering event at DECISION OPERATION 406, the method 400 proceeds to OPERATION 408, where the frontend of the intelligent assistant system 108 raises an event to the backend of the intelligent assistant system 108. In some examples, the frontend of the intelligent assistant system 108 communicates a message that includes contextual information, such as a device ID, a user ID, location data, usage data, etc. In some examples, the backend of the intelligent assistant system 108 or the random factoid system 110 looks up usage data or other contextual information for generating a query 310. Further, the random factoid system 110 queries the tips data source 130 or the fun facts data source 140 for a random factoid 302. In some examples, the random factoid system 110 employs a random number generator 117 for generating a random or pseudo-random number for randomly selecting a factoid from the tips data source 130 or the fun facts data source 140. In some examples, the random factoid system 110 queries the tips data source 130 or the fun facts data source 140 for a factoid based on a predetermined ratio. In other examples, the random factoid system 110 queries the tips data source 130 or the fun facts data source 140 for a factoid based on contextual information, such as location, user interests, unused features, regularly-used applications, and the like.

At OPERATION 410, the selected random factoid 302 is provided to the user 102. In some examples, the random factoid 302 provided to the user 102 is a fun factoid, such as "Our eyes are always the same size from birth, but our nose and ears never stop growing." In other examples, the random factoid 302 provided to the user 102 is a helpful learning tip, such as "Did you know you can ask me to set an alarm for you?". According to one example, the helpful tip is randomly selected; whereas, according to another example, the tip is selected in response to a recent intelligent assistant application update that includes a new functionality such as for setting alarms on behalf of a user 102. The method 400 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
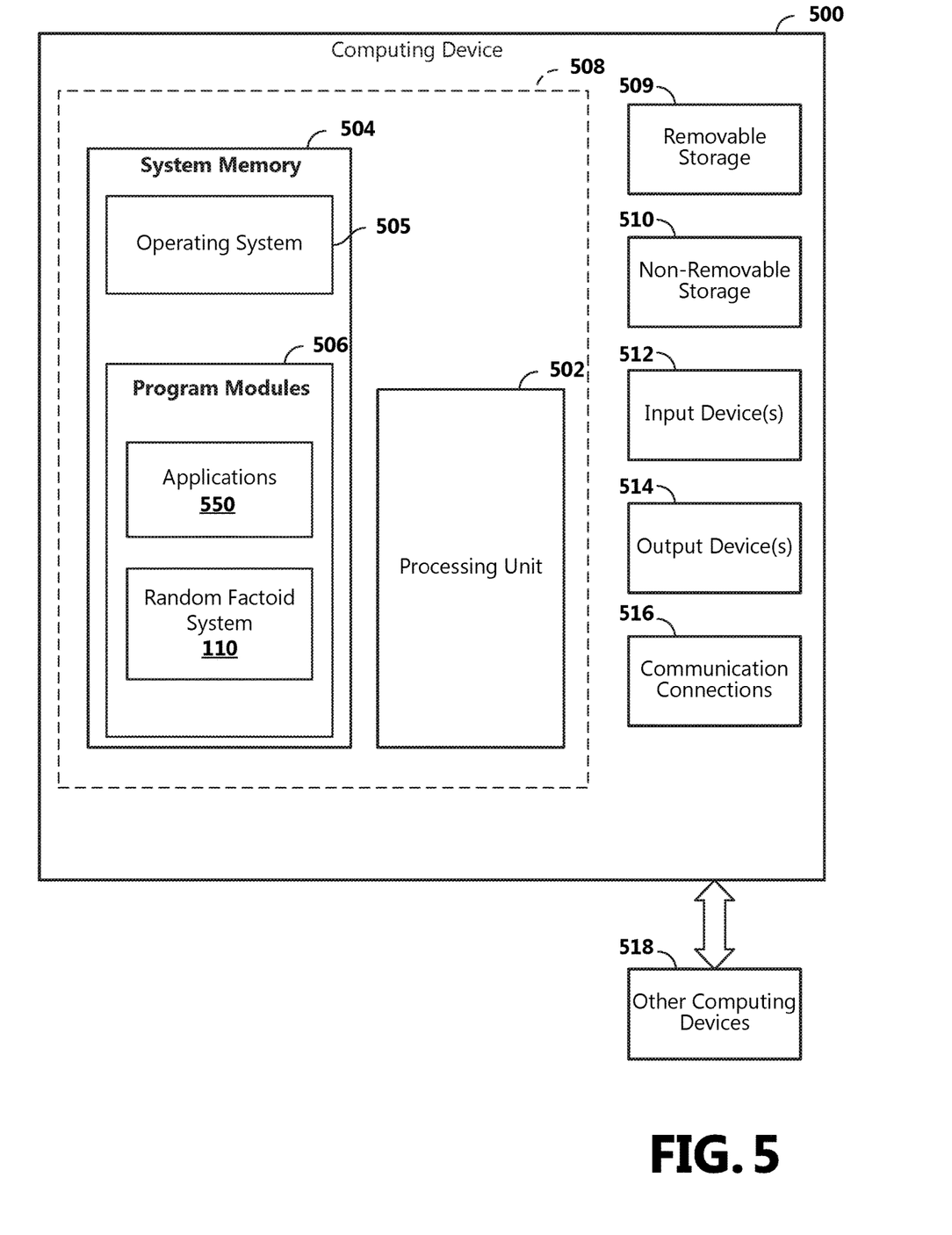
FIG. 5 is a block diagram illustrating physical components of a computing device with which examples may be practiced.
Figure 6A:
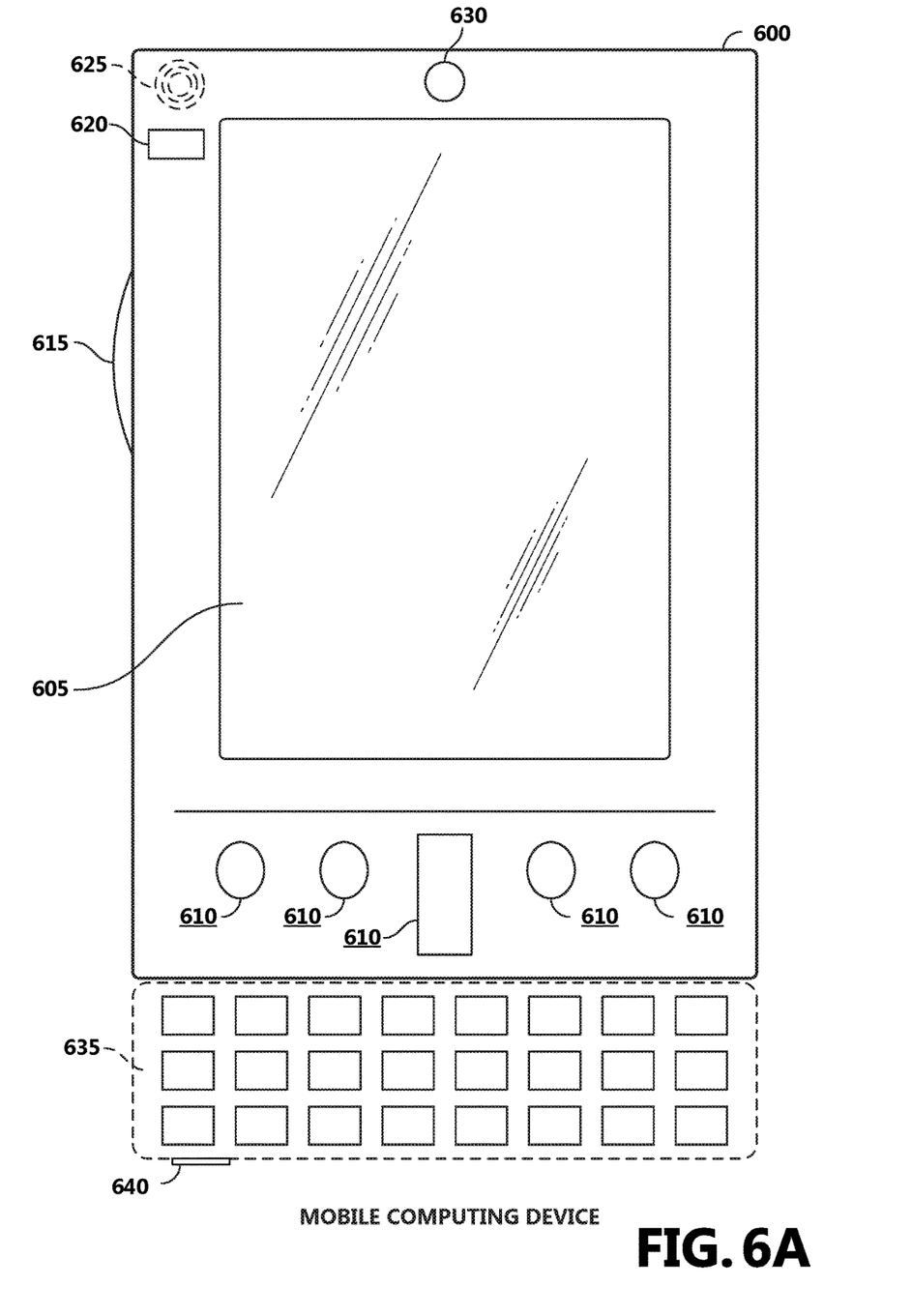
FIGS. 6A and 6B are block diagrams of a mobile computing device with which aspects may be practiced.
Figure 6B:
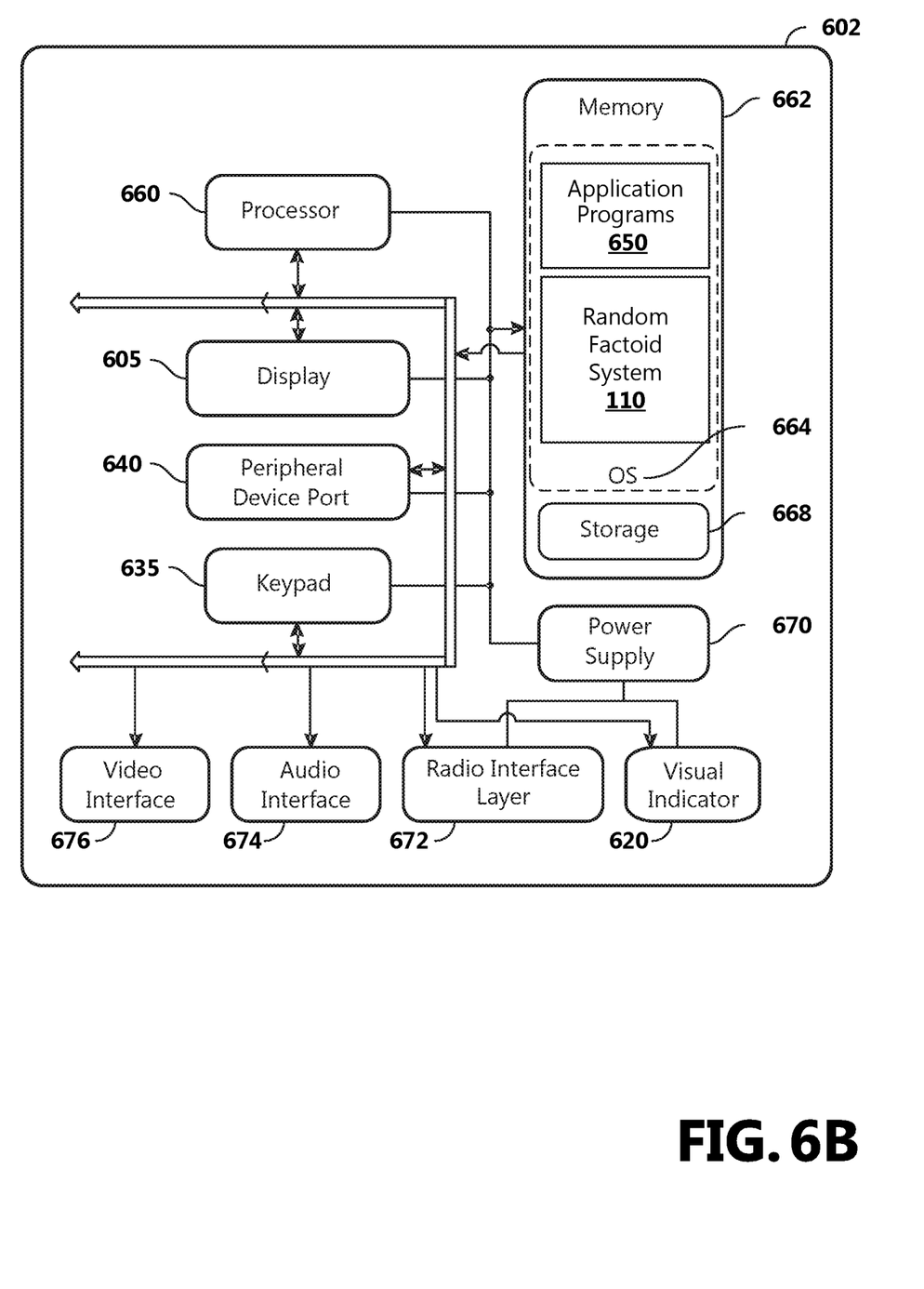
Figure 7:
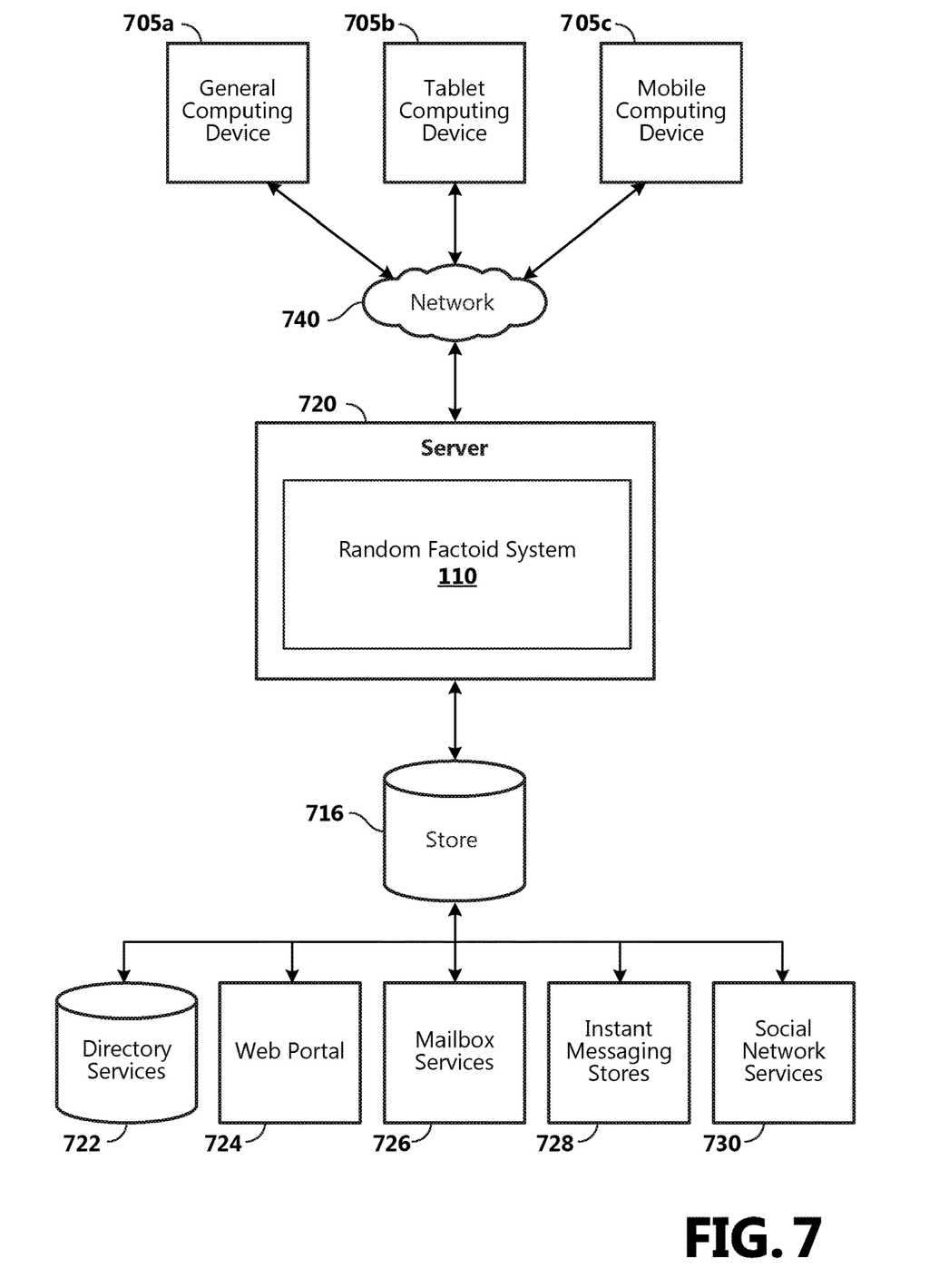
FIG. 7 is a block diagram of a distributed computing system in which aspects may be practiced.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure are practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the random factoid system 110. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., random factoid system 110) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided drafting application programs, etc.

According to an example, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system intelligentization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the random factoid system 110 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing random factoids, as described above. Content developed, interacted with, or edited in association with the random factoid system 110 is enabled to be stored in different communication channels or other storage types. For example, various documents may be stored using a directory service 722, a web portal 724, a mailbox service 726, an instant messaging store 728, or a social networking site 730. The random factoid system 110 is operative to use any of these types of systems or the like for providing random factoids, as described herein. According to an aspect, a server 720 provides the random factoid system 110 to clients 705*a,b,c*. As one example, the server 720 is a web server providing the random factoid system 110 over the web. The server 720 provides the random factoid system 110 over the web to clients 705 through a network 740. By way of example, the client computing device is implemented and embodied in a personal computer 705*a*, a tablet computing device 705*b* or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for providing a factoid, comprising:
   a processor; and
   a computer readable data storage device storing instructions that, when executed by the processor are operative to:
      receive an input;
      determine the input is a factoid triggering event;
      query one or more data sources to select a factoid from a plurality of factoids comprised of at least two factoid types, a first of the at least two factoid types including fun factoids associated with one or more of jokes, trivia, encyclopedic information, and entertaining information and a second of the at least two factoid types including helpful tip factoids associated with commands for accessing or using features of a device or application of the device through which the input is received; and
      generate at least one of a visual display or an audible output of the selected factoid.

2. The system of claim 1, wherein the one or more data sources include at least one of:
   a fun facts database storing the fun factoids;
   a list of the fun factoids;
   an index of web-based content including the fun factoids;
   a tips database storing the helpful tip factoids;
   a list of the helpful tip factoids; and
   an index of web-based content including the helpful tip factoids.

3. The system of claim 1, wherein in querying the one or more data sources, the system is operative to query the one or more data sources based on a predetermined ratio of the fun factoids to the helpful tip factoids.

4. The system of claim 1, wherein in querying the one or more data sources, the system is operative to query the one or more data sources to select the factoid based on contextual information.

5. The system of claim 1, wherein in querying the one or more data sources, the system is further operative to:
   generate a pseudo-random number; and
   select the factoid corresponding to the generated pseudo-random number.

6. The system of claim 1, wherein the input includes one of:
   a tap;
   a gesture;
   an utterance;
   a selection of a button; or
   an environmental condition.

7. A method for providing a factoid, comprising:
   receiving an input;
   determining the input is a factoid triggering event;
   querying one or more data sources to select a factoid from a plurality of factoids comprised of at least two factoid types, a first of the at least two factoid types including fun factoids associated with one or more of jokes, trivia, encyclopedic information, and entertaining information and a second of the at least two factoid types including helpful tip factoids associated with commands for accessing or using features of a device or application of the device through which the input is received; and
   generating at least one of a visual display or an audible output of the selected factoid.

8. The method of claim 7, wherein querying the one or more data sources comprises:
   querying a fun facts database or a list or an index of web-based content for the fun factoids; and
   querying a tips database or a list or an index of web-based content for the helpful tip factoids.

9. The method of claim 7, wherein querying the one or more data sources comprises querying the one or more data sources based on a predetermined ratio of the fun factoids to the helpful tip factoids.

10. The method of claim 7, wherein querying the one or more data sources comprises querying the one or more data sources to select the factoid based on contextual information.

11. The method of claim 7, wherein querying the one or more data sources further comprises:
   generating a random or a pseudo-random number; and
   selecting the factoid corresponding to the generated random or the pseudo-random number.

12. The method of claim 7, wherein receiving the input comprises at least one of:
   receiving an indication of a tap;
   receiving an indication of a gesture;
   receiving an indication of an utterance;
   receiving an indication of a selection of a button; and
   receiving an indication of an environmental condition.

13. The method of claim 7, wherein generating the visual display or the audible output of the selected factoid further comprises:
   retaining temporary knowledge of the selected factoid for providing context in understanding an intent of a user-provided follow-up input;
   receiving the follow-up input;
   processing the follow-up input to understand the intent; and
   querying the one or more data sources for a response to the follow-up input to provide to the user.

14. The method of claim 13, further comprising opening a microphone operatively connected to a computing device for receiving the user-provided follow-up input.

15. A computer readable storage device including computer readable instructions, which when executed by a processing unit is operative to:
   receive an input;
   determine the input is a random factoid triggering event;
   query one or more data sources to randomly select a factoid from a plurality of factoids comprised of at least two factoid types, a first of the at least two factoid types including fun factoids associated with one or more of jokes, trivia, encyclopedic information, and entertaining information and a second of the at least two factoid types including helpful tip factoids associated with commands for accessing or using features of a device or application of the device through which the input is received; and generate at least one of: a visual display or an audible output of the selected factoid.

16. The computer readable storage device of claim 15, wherein the one or more data sources include at least one of:
a fun facts database storing the fun factoids;
a list of the fun factoids;
an index of web-based content including the fun factoids;
a tips database storing the helpful tip factoids;
a list of the helpful tip factoids; and
an index of web-based content including the helpful tip factoids.

17. The computer readable storage device of claim 15, wherein in querying the one or more data sources, the device is operative to query the one or more data sources based on a predetermined ratio of the fun factoids to the helpful tip factoids.

18. The computer readable storage device of claim 15, wherein in querying the one or more data sources, the device is operative to query the one or more data sources to select the factoid based on contextual information.

19. The computer readable storage device of claim 15, the device is further operative to:
generate a random or a pseudo-random number; and
select the factoid corresponding to the generated random or the pseudo-random number.

20. The computer readable storage device of claim 15, wherein the input includes one of:
a tap;
a gesture;
an utterance;
a selection of a button; or
an environmental condition.

* * * * *